(12) United States Patent
Nefedov

(10) Patent No.: US 7,139,336 B2
(45) Date of Patent: Nov. 21, 2006

(54) METHOD AND SYSTEM FOR CHANNEL ESTIMATION USING ITERATIVE ESTIMATION AND DETECTION

(75) Inventor: Nikolai Nefedov, Espoo (FI)

(73) Assignee: Nokia Corporation, Espoo (FI)

( * ) Notice: Subject to any disclaimer, the term of this patent is extended or adjusted under 35 U.S.C. 154(b) by 924 days.

(21) Appl. No.: 10/113,498

(22) Filed: Apr. 5, 2002

(65) Prior Publication Data

US 2003/0189992 A1    Oct. 9, 2003

(51) Int. Cl.
*H04L 27/06* (2006.01)

(52) U.S. Cl. ............... 375/341; 375/340; 375/329; 375/262; 375/232; 375/346; 375/229; 370/203; 370/347; 345/582; 348/614; 704/233; 455/504

(58) Field of Classification Search ........... 375/340, 375/329, 262, 341, 232, 346, 229; 370/203; 345/582; 348/614; 704/233; 455/504
See application file for complete search history.

(56) References Cited

U.S. PATENT DOCUMENTS

| | | | | |
|---|---|---|---|---|
| 5,111,298 | A * | 5/1992 | Koo ........................ | 348/614 |
| 5,727,124 | A * | 3/1998 | Lee et al. ................ | 704/233 |
| 6,700,937 | B1 * | 3/2004 | Turin ...................... | 375/262 |
| 6,748,031 | B1 * | 6/2004 | Piirainen ................ | 375/340 |
| 6,768,713 | B1 * | 7/2004 | Siala et al. ............. | 370/203 |
| 6,864,897 | B1 * | 3/2005 | Brand ..................... | 345/582 |
| 6,868,276 | B1 * | 3/2005 | Nissila ................... | 455/504 |
| 6,990,092 | B1 * | 1/2006 | Siala ...................... | 370/347 |
| 6,993,070 | B1 * | 1/2006 | Berthet et al. .......... | 375/232 |
| 2003/0147476 | A1 * | 8/2003 | Ma et al. ................ | 375/329 |

OTHER PUBLICATIONS

Kullback, *Information Theory and Statistics*, pp. 1-10, 12-31, 36-66, 189-207, 211-295, 297-334, New York, John Wiley, 1959.
Golomb, *Shift Register Sequences*, pp. 7-22, 25-74, 110-149, 169-196, Holden-Day Inc., 1967.
Bahl et al., "Optimal Decoding of Linear Codes for Minimizing Symbol Error Rate", *IEEE Trans. Inform. Theory*, vol. 20, pp. 284-287, Mar. 1974.
Dempster et al., "Maximum Likelihood From Incomplete Data Via EM Algorithm," *Journal of the Royal Stat. Soc.*, vol. B-39, pp. 1-38, 1977.
Wu, "On Convergence Properties of the EM Algorithm", *The Annals of Statistics*, vol. 11, No. 1, pp. 95-103, 1983.

(Continued)

*Primary Examiner*—Chieh M. Fan
*Assistant Examiner*—Sudhanshu C. Pathak
(74) *Attorney, Agent, or Firm*—Darby & Darby P.C.; John W. Branch

(57) ABSTRACT

A method and system are directed to enabling a detector to perform relatively accurate channel estimates on blocks of data that include relatively short training sequences in wireless communication signals. Channel re-estimation is performed by transferring the estimation calculations from the time domain into a channel state domain. In one embodiment, information obtained from known training sequences and unknown data may be combined to generate an initial channel estimate. An embodiment of a new recursive Expectation Maximization (EM) process generally i) initializes the EM process with the initial channel estimate; ii) determines updates for the channel estimates; iii) produces a reduced observation vector; iv) generates a special sequence of channel states; v) rearranges each channel state estimate in the reduced observation vector; vi) generates a low-dimensional channel model matrix inversion based on the generated special sequence of channel states; and vii) generates channel estimates based on the generated matrix inversion.

16 Claims, 8 Drawing Sheets

OTHER PUBLICATIONS

Krishnamurty et al., "On-Line Estimation of Hidden Markov Model Parameters Based on Kullback-Leibler Information Measure", *IEEE Trans. On SP*, vol. 41, pp. 2557-2573, Aug. 1993.

Seshadri et al., "Two Signaling-Schemes For Improving The Error Performance of Frequency-Division-Duplex FDD Transmission Systems Using Transmitter Antenna Diversity", *Proc. IEEE VTC*, pp. 508-511, 1993.

Seshadri, "Joint Data And Channel Estimation Using Fast Blind Trellis Search Techniques", *IEEE Trans. Comm.*, vol. 42, pp. 1000-1011, Feb./Mar./Apr. 1994.

Kaleh et al., "Joint Parameter Estimation And Symbol Detection For Linear and Nonlinear Unknown Channels", *IEEE Trans. Comm.*, vol. 42, pp. 2406-2413, Jul. 1994.

Chang et al., "Iterative Joint Sequence And Channel Estimation For Fast Time-Varying Intersymbol Interference Channels", *Proc. IEEE ICC '95*, pp. 357-361, 1995.

Haykin, *Adaptive Filter Theory*, 3d ed., pp. 217-220, 241-295, 899-904, Prentice Hall, 1996.

Georghiades et al., "Sequence Estimation In The Presence Of Random Parameters Via EM Algorithm", *IEEE Trans. Comm.*, vol. 45, pp. 300-308, Mar. 1997.

ESTI GSM05.03, *Digital Cellular Telecommunications System (Phase 2+) Channel Coding*, rel. 1999.

Pirhonen et al., "TDMA Convergence For Packet Data Services", *IEEE Personal Comm.*, pp. 68-73, Jun. 1999.

Nefedov et al., "Iterative Channel Estimation for GPRS", *Proc. IEEE PIMRC '2000*, pp. 999-1003, 2000.

Nefedov et al., "Turbo Equalization And Iterative (Turbo) Estimation Techniques For Packet Data Transmission", *Proc. Int. Symp. On Turbo Codes (ISTC 2000)*, pp. 423-426, 2000.

Andrieu et al., "Simulated Annealing For Maximum A Posteriori Parameter Estimation Of Hidden Markov Models", *IEEE Trans. Inform. Theory*, vol. 46, pp. 994-1004, May 2000.

Turin, "MAP Decoding In Channels With Memory", *IEEE Trans. Comm.*, vol. 48, pp. 757-763, May 2000.

Buchoux et al., "On The Performance Of Semi-Blind Subspace-Based Channel Estimation", *IEEE Trans. On SP*, vol. 48, pp. 1750-1759, Jun. 2000.

Nefedov et al., "An EM-Based Receiver For Short Block Semi-Blind Detection", *Proc. IEEE ICT 2001*, pp. 70-75, 2001.

\* cited by examiner

PRIOR ART <span style="display:inline-block; width: 4em"></span> PRIOR ART

METHOD AND SYSTEM FOR CHANNEL ESTIMATION USING ITERATIVE ESTIMATION AND DETECTION

FIELD OF THE INVENTION

The invention relates generally to receiving wireless communications, and more particularly, to a detector that improves joint channel estimation and short block detection for received wireless communications.

BACKGROUND OF THE INVENTION

A multiple access wireless communication system enables multiple users to simultaneously access and use the system. These systems employ multiple access schemes, such as Frequency Division Multiple Access (FDMA), Time Division Multiple Access (TDMA) and Code Division Multiple Access (CDMA). For FDMA, the multiple access wireless communication system's spectrum is divided into fixed frequency slots and users are allocated one or more slots for communication.

For CDMA, the multiple access wireless communication system assigns a unique code to each user that is used to modulate a signal from the user and that modulation identifies the user to the system. In CDMA systems, all users transmit and receive code-modulated data simultaneously, and the data for a given user is distinguished at the receiver using the code assigned to that user.

For TDMA, the multiple access wireless communication system divides time into fixed slots and users are allocated one or more time slots for communication over the system. Additionally, Global System for Mobile communications (GSM), is another type of multiple access wireless communication system that employs narrow band TDMA to allow at least eight simultaneous telephone calls on the same radio frequency.

Typically, a forward communication channel is used to transmit data signals from a base station to a mobile station; and a reverse communication channel is employed to transmit data signals from the mobile station to the base station. However, the transmission of a signal through a wireless medium can have arbitrary attenuation and delay due to hilly terrain, atmospheric conditions, outages and other factors. Also, the Doppler frequency shift in wireless signals transmitting from a fast moving vehicle can create fast fading channels where channel parameters can vary within each received block of data. To compensate for these less than ideal conditions, a base station's detector will employ various methods to estimate the attenuation and delay introduced in communication channel so that it can detect and identify each user's signal in the received signals.

For example, TDMA wireless communication systems often employ a training sequence that is included in each transmitted block of data to estimate channel. These methods usually employ an inverse of a matrix formed from the training sequence data. Also, since the training sequence can be known in advance, the inverse is typically precalculated and not separately performed for each received block of data. Similarly, CDMA wireless communication systems employ substantially the same methods based on a pilot signal that is included in each block of data.

Recently it has been shown that schemes exploiting several uncorrelated transmitting antennas are very promising for wireless communications. For example, delay diversity transmission (DDT), the simplest transmit diversity scheme in which delayed copies of the modulated signal are transmitted from multiple antennas, can significantly improve the performance of receiving devices (detectors). However, the transmit diversity gain is obtained by artificially introduced multipath requiring more channel parameters to be estimated given the same training sequence. Hence, the transmit diversity gain may not be fully utilized due to degradation of channel estimation accuracy. For example, accuracy of channel estimates based only on GSM training sequences (originally designed for channels without transmit diversity) may be not enough for transmit diversity schemes that in turn deteriorates the receiver performance.

The receiver performance may be improved by utilizing semi-blind detection methods, which combine information obtained from the known training sequence and unknown data to improve channel estimates. In particular, data-aided iterative channel estimation (ICE) or joint channel estimation and symbol detection based on the Expectation-Maximization (EM)-algorithm along with other iterative methods may be used. However, application of these methods implies a complicated inverse of a matrix formed by all transmitted data in a block. Since this matrix includes random transmitted together with known training sequence, then computational demanding matrix inverse should be performed for each transmitted block. Thus, there is a need for a low complexity matrix inverse that may be embedded into the EM (or some other iterative process) based receiver.

SUMMARY OF THE INVENTION

The present invention is directed at addressing the above-mentioned shortcomings, disadvantages and problems, and will be understood by reading and studying the following specification.

According to one aspect of the invention, a method is provided to improve the performance of a wireless signal detector that employs a modified Expectation Maximization (EM) method for joint channel estimation and data detection. Channel re-estimation is simplified by transferring the estimation calculations from the time domain into a principal subspace (channel state) domain. In doing so, high-dimensional online matrix inversions can be replaced with the inventive pre-calculated low-dimensional matrix inversions. Semi-blind detection methods are employed to combine information obtained from known training sequence and unknown data to improve channel estimates. By embedding the less complex algorithm for channel inverse into EM iterations, the EM convergence is improved for blocks of data with short training sequences.

Although some received signals may be affected by attenuation, delay and other factors, a detector employing the inventive modified EM method can provide relatively accurate channel estimates. Also, the modified EM method's pre-calculated low-dimensional matrix inversion reduces a detector's demands on processing resources. Additionally, the modified EM method enables a detector to perform relatively accurate channel estimates on blocks of data that include relatively short training sequences.

In accordance with yet another aspect of the invention, an apparatus such as a base station may be employed to implement substantially all of the methods described above. The base station can be coupled to several different types of networks in different ways and enable wireless communication with mobile stations.

DETAILED DESCRIPTION OF THE PREFERRED EMBODIMENT

Figure 1:
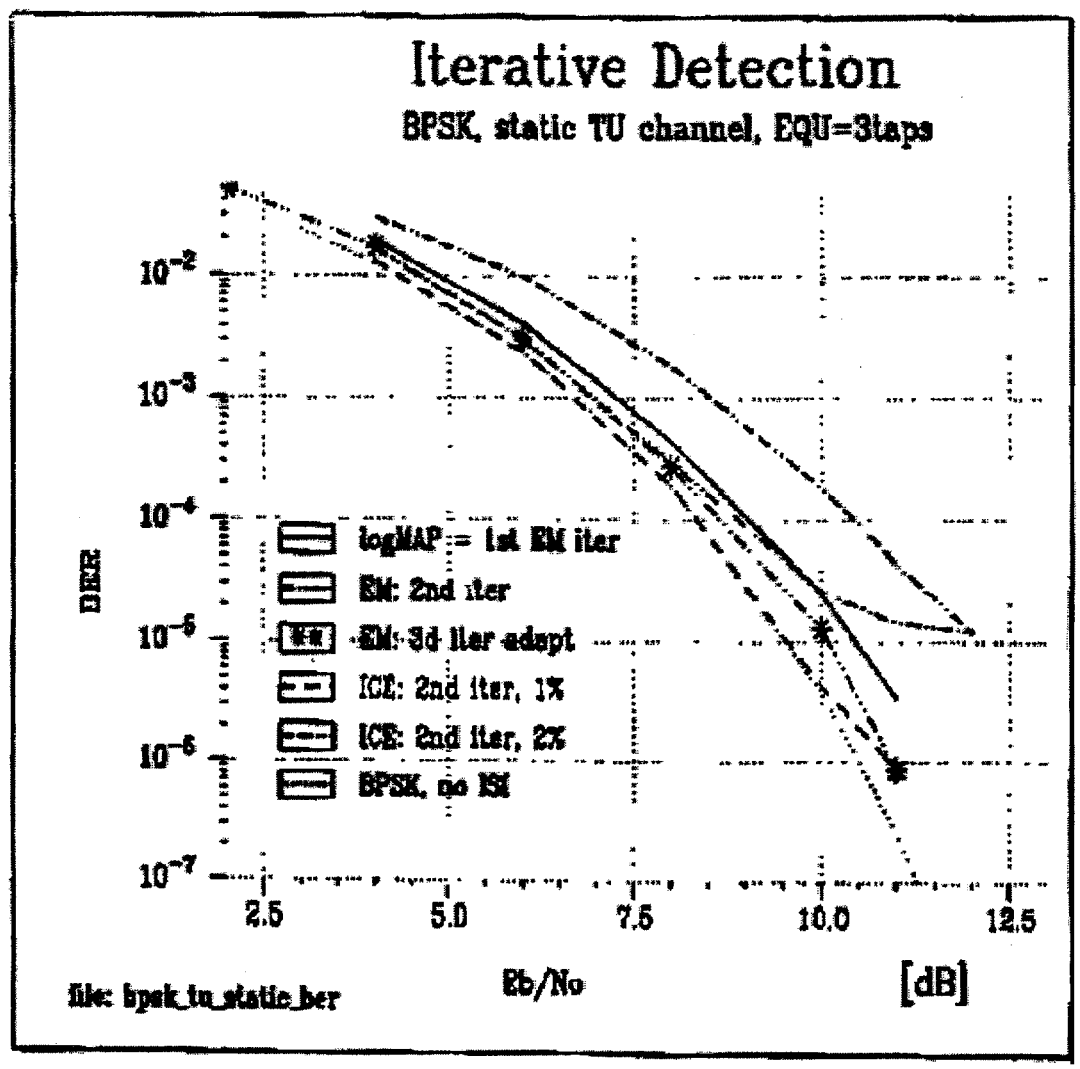
FIG. 1 illustrates a graph of the performance of a detector by plotting block error rate (BER) versus decibels (db) for EM and ICE methods.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a", "an," and "the" include plural references. The meaning of "in" includes "in" and "on." Referring to the drawings, like numbers indicate like parts throughout the views. Additionally, a reference to the singular includes a reference to the plural unless otherwise stated or is inconsistent with the disclosure herein.

The term "node" refers to a network element that monitors a load for a link within a path. The term "link load" refers to the load associated with the node. The term "flow" means a flow of IP packets. The term support node refers to both Gateway General Packet Radio Service Support Node (GGSN) and Serving General Packet Radio Service Support Node (SGSN) nodes.

The term "user" refers to any person or customer such as a business or organization that employs a mobile device to communicate or access resources over a mobile network. The term "operator" refers to any technician or organization that maintains or services an IP packet based network. The term "identifier" includes a Mobile Station International Subscriber Directory Number (MSISDN) number, an IP address, or any other information that relates to the location or identity of the user. The term "modulated data signal" means a signal that has one or more of its characteristics set or changed in such a manner as to encode information in the signal.

The term "router" refers to a dedicated network element that receives IP packets and forwards them to their destination. In particular, a router is used to extend or segment networks by forwarding IP packets from one logical network to another. A router typically operates at layer 3 and below of the Open Systems Interconnection (OSI) reference model for networking. However, some routers can provide additional functionality that operates above layer 3 of the OSI reference model.

The term "base station" refers to a relatively stationary wireless network device that can forward/route communications between distant mobile stations that are part of the same or another wireless network. Also, the base station can enable mobile stations to communicate with resources accessible on a wired network that is coupled to the base station. The base station may communicate wirelessly with other base stations and may enable the forwarding of mobile station communications over a wired network. The base station can perform handover management and various measurements such as triangulating the location of a mobile station.

Referring to the drawings, like numbers indicate like parts throughout the views. Additionally, a reference to the singular includes a reference to the plural unless otherwise stated or is inconsistent with the disclosure herein.

The invention improves the performance of a wireless signal detector with a modified Expectation Maximization (EM) algorithm (method) for joint channel estimation and data detection. Channel re-estimation is simplified by transferring the estimation calculations from the time domain into a principal subspace (channel state) domain. In doing so, high-dimensional online matrix inversions can be replaced with the inventive pre-calculated low-dimensional channel model matrix inversions. Semi-blind detection methods are employed to combine information obtained from known training sequence and unknown data to improve channel estimates. By embedding a less complex algorithm for channel model inverse calculations into EM iterations, the EM convergence is improved for blocks of data with short training sequences. In particular, the modified EM algorithm enables a detector to perform relatively accurate channel estimates on blocks of data that include relatively short training sequences.

Although some received wireless signals may be adversely affected by attenuation, delay and other factors, a detector employing the inventive modified EM method can provide relatively accurate channel estimates. Also, the modified EM method's pre-calculated low-dimensional matrix inversion reduces a detector's demands on processing resources.

At least in part, many of the implementation details to practice the modified EM method and ICE algorithms are described in Appendix A. In particular, steps six, seven and eight in Appendix A, pages A-8 through A-9, are directed to the inventive channel model inverse employed in the modified EM method. Also, Appendix B discusses the operation of k-stage linear recursive shift registers for generating sequences in the modified EM method. Additionally, Appendix C lists several publications that are referenced in Appendixes A and B and which provide background information regarding the modified EM method.

FIG. 1 illustrates a graph of bit error rate (BER) plotted against decibels (dB) for an EM based detector in a static typical urban (TU) channel with binary signaling. As shown in the figure, the use of adaptive EM and ICE detectors provides more than one decibels of gain. See Appendix A, page A-9, for a more detailed discussion of this graph.

Figure 2:
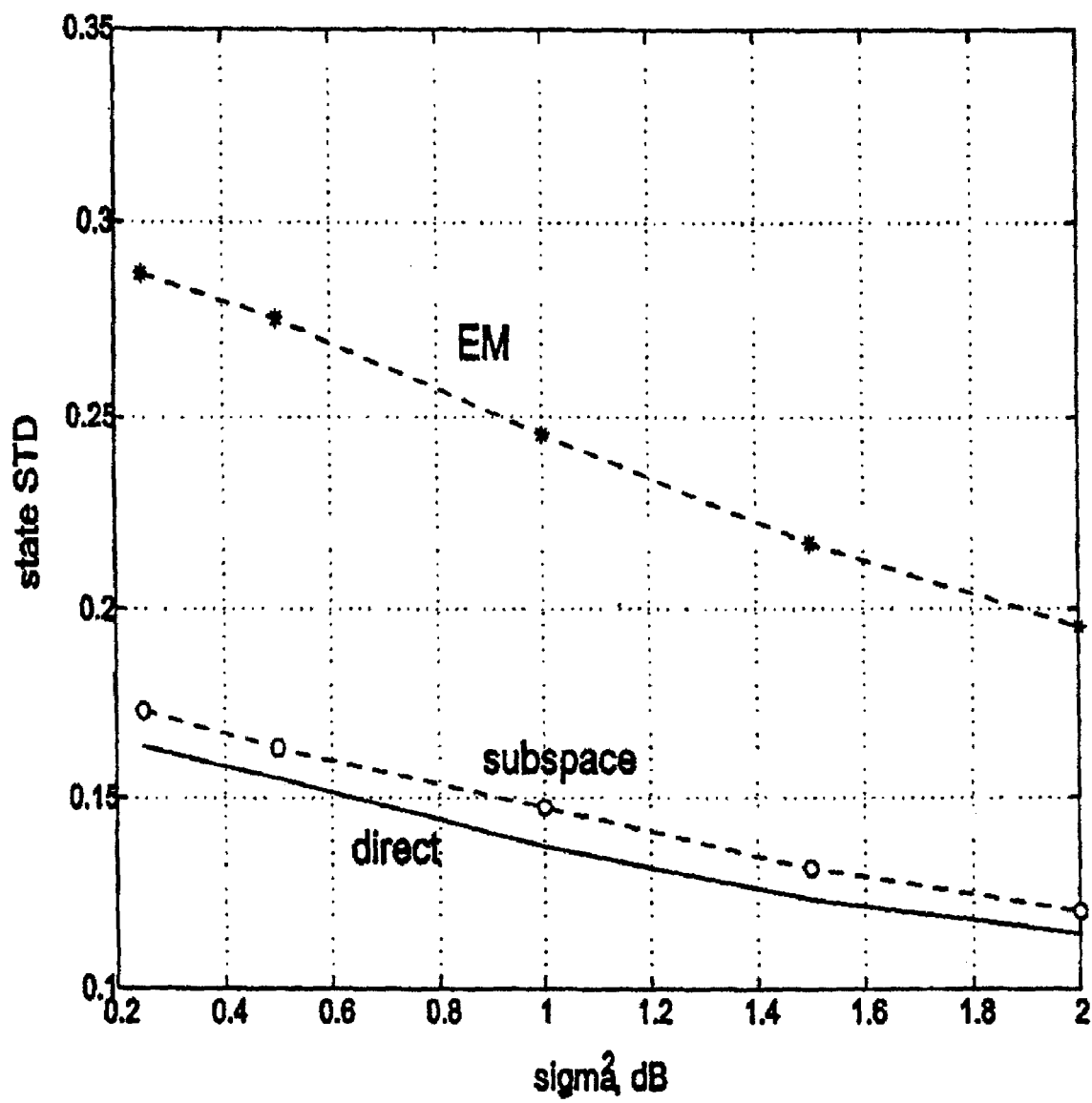
FIG. 2 shows a graph plotting the accuracy of channel estimates calculated with an EM method without channel model inverse, with direct channel inverse and the proposed simplified channel model inverse calculations.

FIG. 2 illustrates a graph showing the accuracy of channel estimates with and without the inventive channel model inverse for EM-based detector. The results are derived from a simulation of 10,000 blocks of length 100 symbols for three taps with CIR equal to 0.77, 0.55 and 0.33. The dashed line with stars shows the standard deviation estimates obtained via an EM algorithm without channel inverse. The other lines show the accuracy of channel state estimates where channel states are formed from estimated channel taps. In particular, accuracy of channel taps that are calculated for every transmitted block based on the direct channel model inverse are represented by the solid line. Also, channel taps that are calculated for transmitted blocks with the modified EM method (using the improved channel model inverse) are represented in the graph by the line with circles. From the figure, it is clear that the improved channel model inverse increases the estimation accuracy as compared to the EM algorithm that does not perform channel inverse calculations. See Appendix A, page A-9, for a more detailed discussion of this graph.

Figure 3:
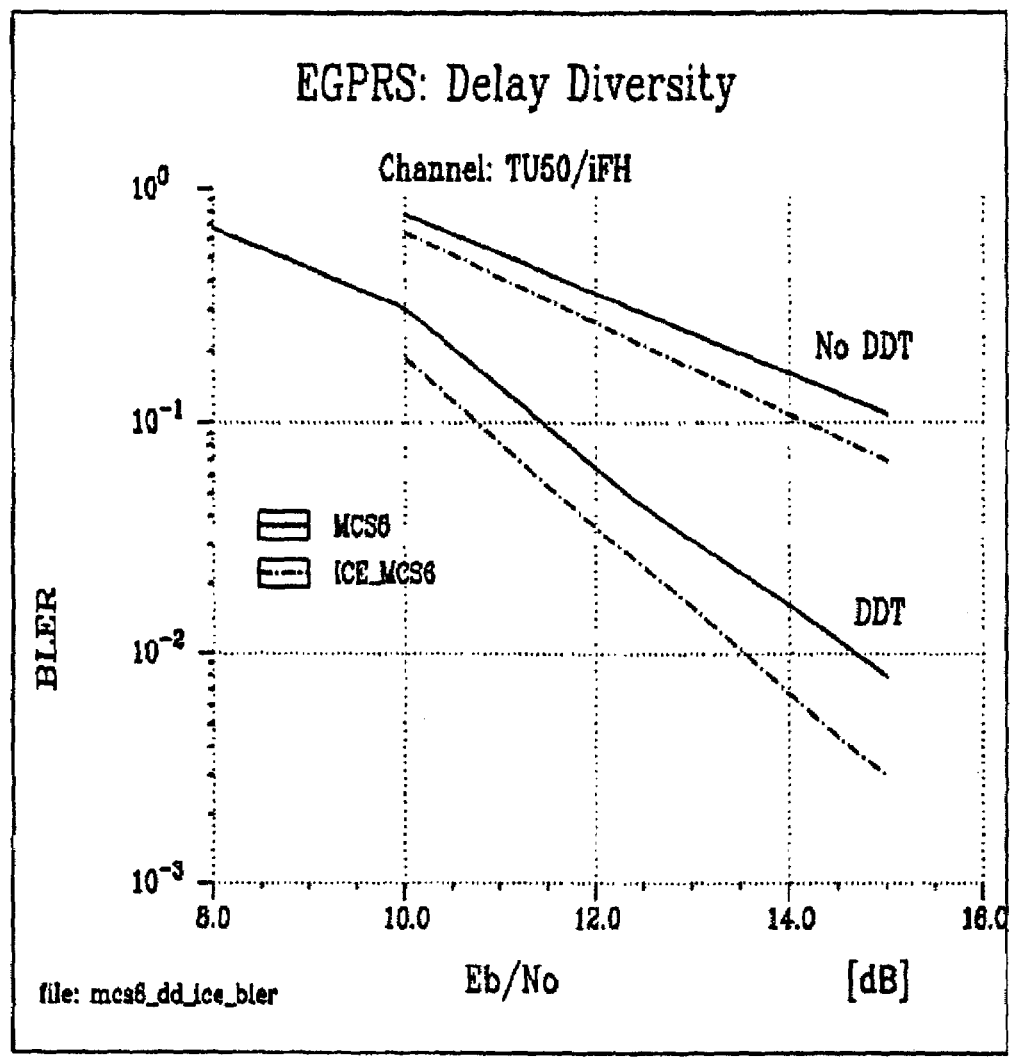
FIG. 3 illustrates performance of conventional and the proposed detectors for diversity delay transmission (DDT) in Enhanced Data rates for Global Evolution (EDGE) for a Typical Urban 50 km/h (TU50) channel.

FIG. 3 illustrates a graph of Block Error Rate (BLER) versus decibels (dB) for diversity delay transmission (DDT) in EDGE for a TU50 channel with ideal frequency for a Modulation and Coding Scheme 6 (MCS6) coding scheme that employs rate ½ convolutional code. In the Figure, the use of ICE methods provides at least one decibel of improvement with or without DDT. See Appendix A, pages A-9 through A-10, for a more detailed discussion of this graph.

Figure 4A:
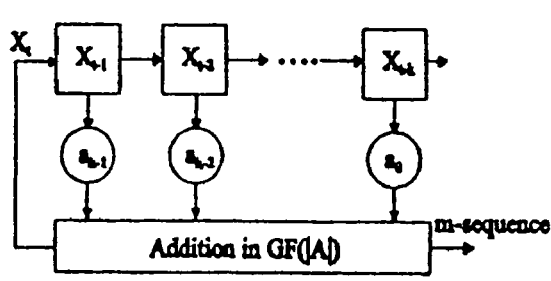
FIG. 4a shows a generic k-stage linear recursive shift register for generating sequences.
Figure 4B:
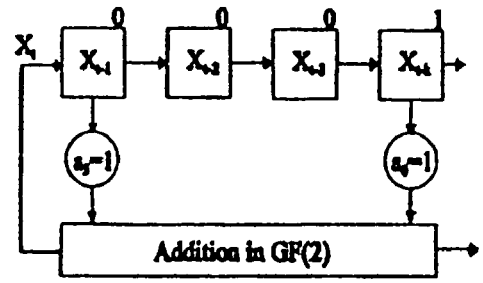
FIG. 4b illustrates an exemplary linear recursive shift register for generating binary sequences with maximum length of $2^4-1$.

FIG. 4a illustrates a generic k-stage linear recursive shift register to generate periodic sequences. See Appendix B, page B-1, for a more detailed discussion of the operation of this register. Also, the k-stage linear recursive shift register operates in substantially the same manner as step six that is described in greater detail in Appendix A, page A-8. Additionally, FIG. 4b illustrates a corresponding shift register whose operation is described in greater detail in Appendix B, page B-1.

Figure 5:
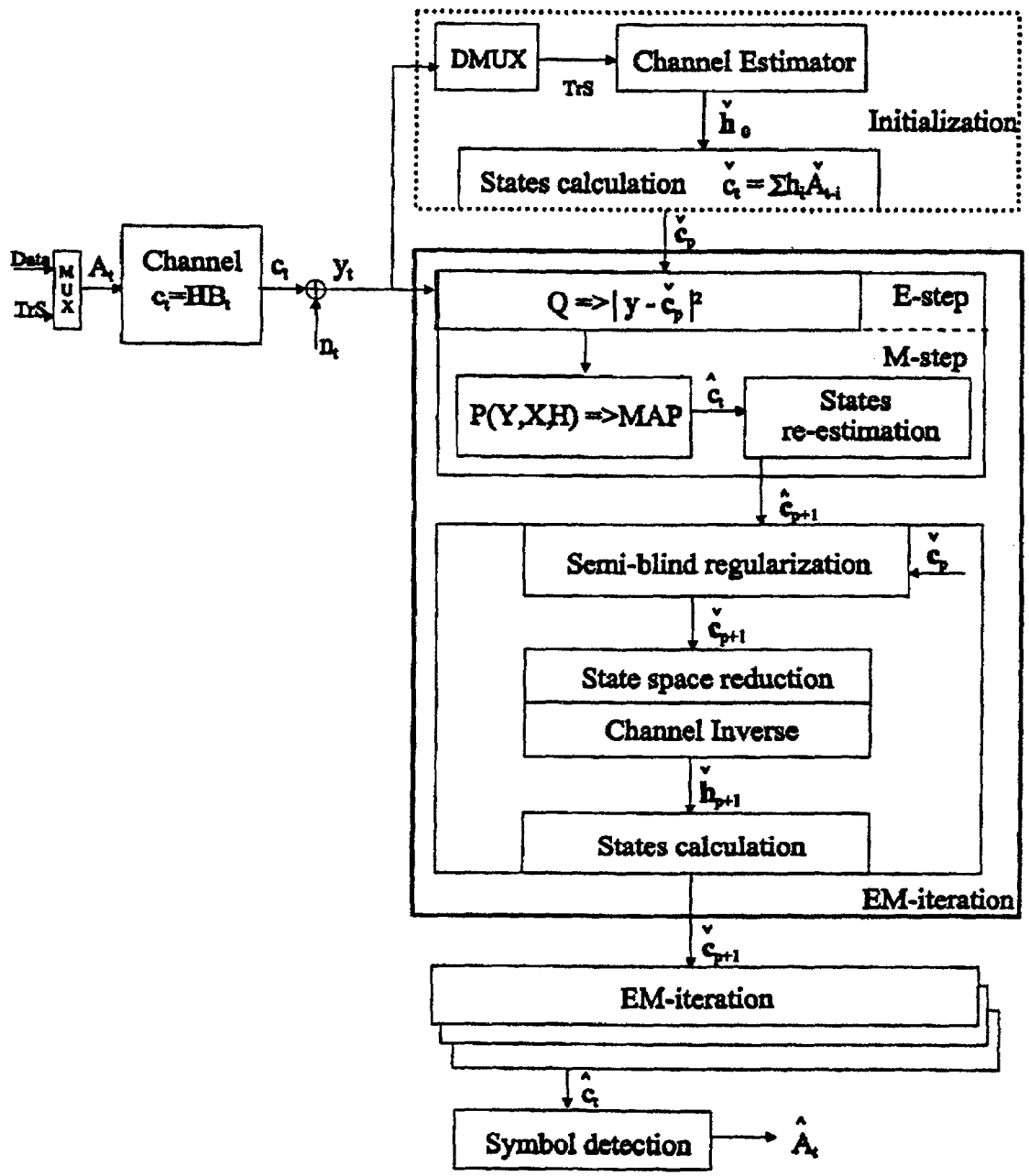
FIG. 5 shows a block diagram of a detector employing the modified EM method.

FIG. 5 illustrates a functional block diagram of at least some of the modules employed in the operation of a detector that employs the inventive modified EM method. In particular, the identified blocks for semi-blind regularization, state space reduction, channel inverse and states calculation are employed to improve the performance of a detector that includes the modified EM method.

Operating Environment

Figure 6:
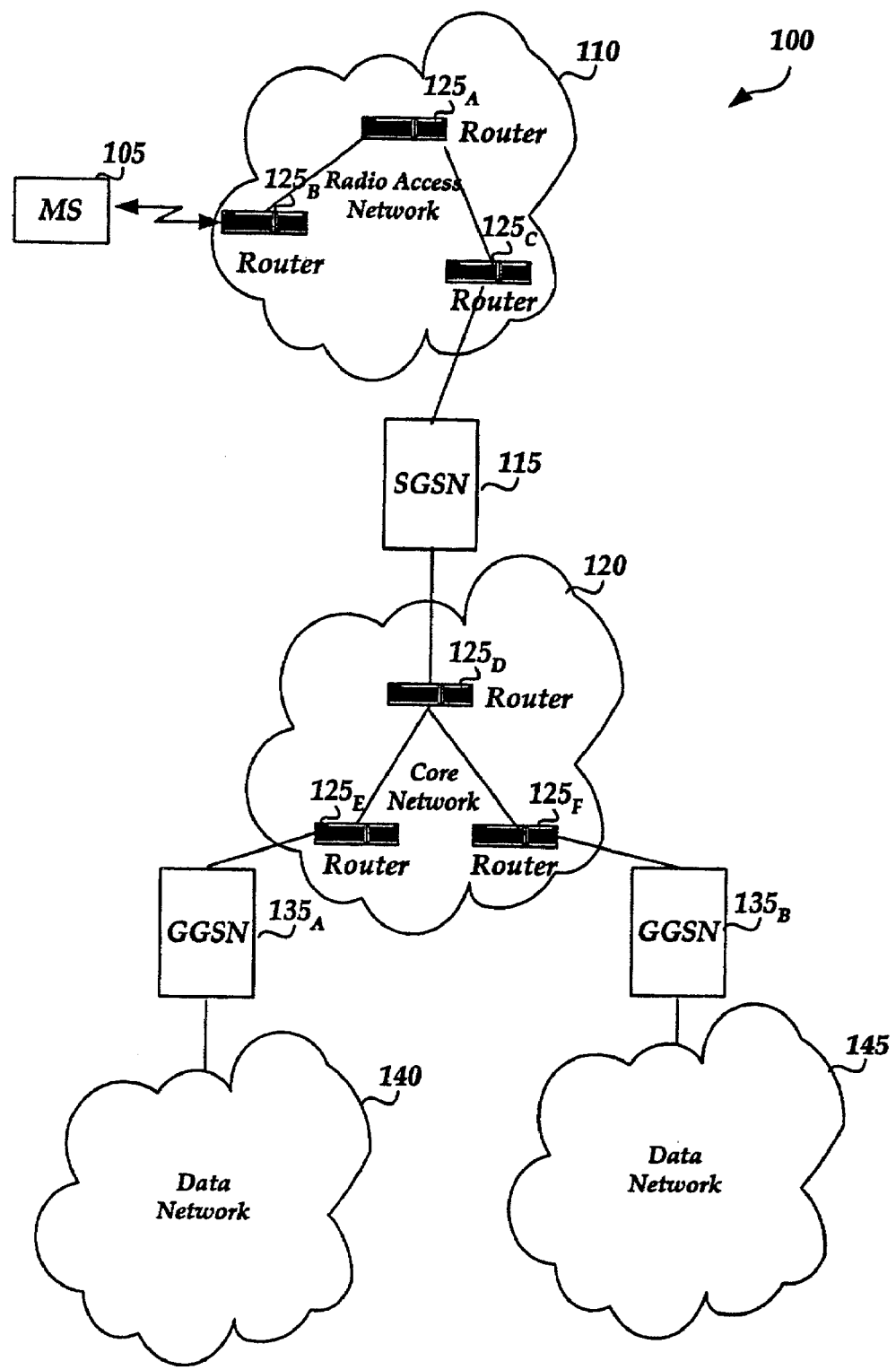
FIG. 6 illustrates an exemplary mobile IP network in which the invention may operate.

With reference to FIG. 6, an exemplary mobile IP network in which the invention may operate is illustrated. As shown in the figure, mobile IP network 100 includes mobile station 105, radio access network (RAN) 110, SGSN 115, core network 120, routers $125_{A-F}$, GGSNs $135_{A-B}$, data network 140, and data network 145. To improve the detection of wireless signals in mobile IP network 100, the inventive modified EM method (with the less complex channel model inverse) may be included in detectors for wireless devices such as mobile stations and base stations.

The connections and operation for mobile IP network 100 will now be described. Mobile station 105 is coupled to radio access network (RAN) 110. Generally, mobile station 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. Mobile station 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as mobile station 105. Radio access network 110 may include both wireless and wired telecommunication components. For example, radio access network 110 may include a cellular tower and/or base stations that are linked to a wired telecommunication network. Typically, the cellular tower carries wireless communication to and from cell phones, pagers, and other wireless devices, and the wired telecommunication network carries communication to regular phones, long-distance communication links, and the like.

As shown in the figure, RAN 110 includes routers $125_{A-C}$. In one embodiment, one or more of routers $125_{A-C}$ may be configured as an internal router for a base station that is coupled to a wired telecommunication network and in communication with wireless devices such as mobile station 105.

Some nodes may be General Packet Radio Service (GPRS) nodes. For example, Serving GPRS Support Node (SGSN) 115 may send and receive data from mobile stations, such as mobile station 105, over RAN 110. SGSN 115 also maintains location information relating to MS 105. SGSN 115 communicates between mobile station 105 and Gateway GPRS Support Node (GGSN)s $135_{A-B}$ through core network 120.

Core network 120 is an IP packet based backbone network that includes routers, such as routers $125_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow mobile station 105 to access network 140 and network 145.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 6. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Figure 7:
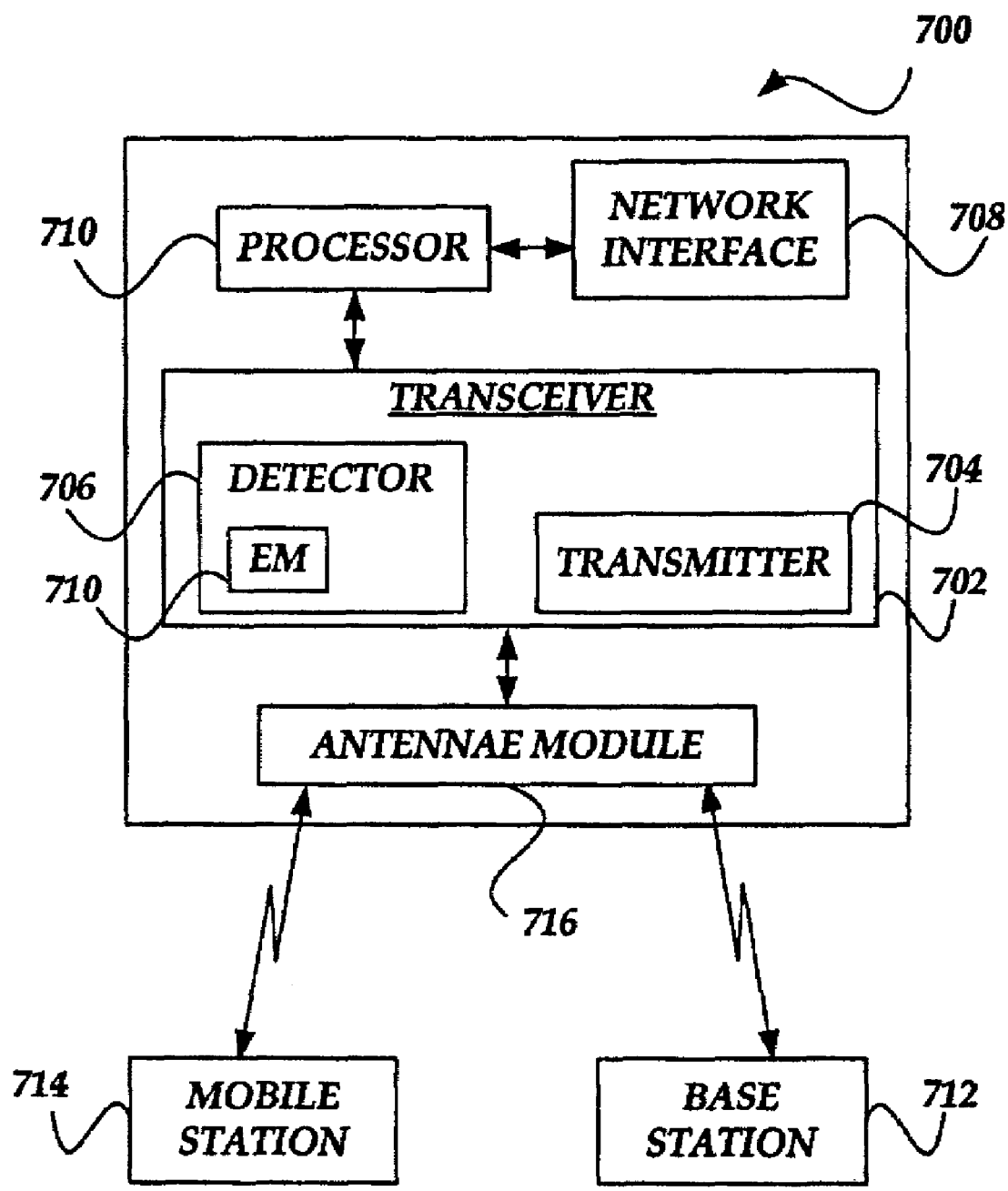
FIG. 7, shows a block diagram of a base station that includes a detector with the modified EM method.

FIG. 7 illustrates a schematic diagram of exemplary base station 700, which includes processor 710, transceiver 702, antennae module 716 and network interface 708. Network interface 708 may be adapted to enable base station 700 to communicate with components on a network over a wired communication link and/or a wireless communication link. Transceiver 702 includes transmitter 704 and detector 706 for sending and receiving wireless signals, respectively, over antennae module 716. Also, detector 706 includes modified EM component 710 for joint channel estimation and detection with signals received from wireless devices such as mobile station 714 and base station 712. Although not shown, detector 706 with modified EM component 710 may be included in a mobile station for joint channel estimation and detection of wireless communication signals received from base stations and other mobile devices.

Joint Channel Estimation and Detection Process

Figure 8:
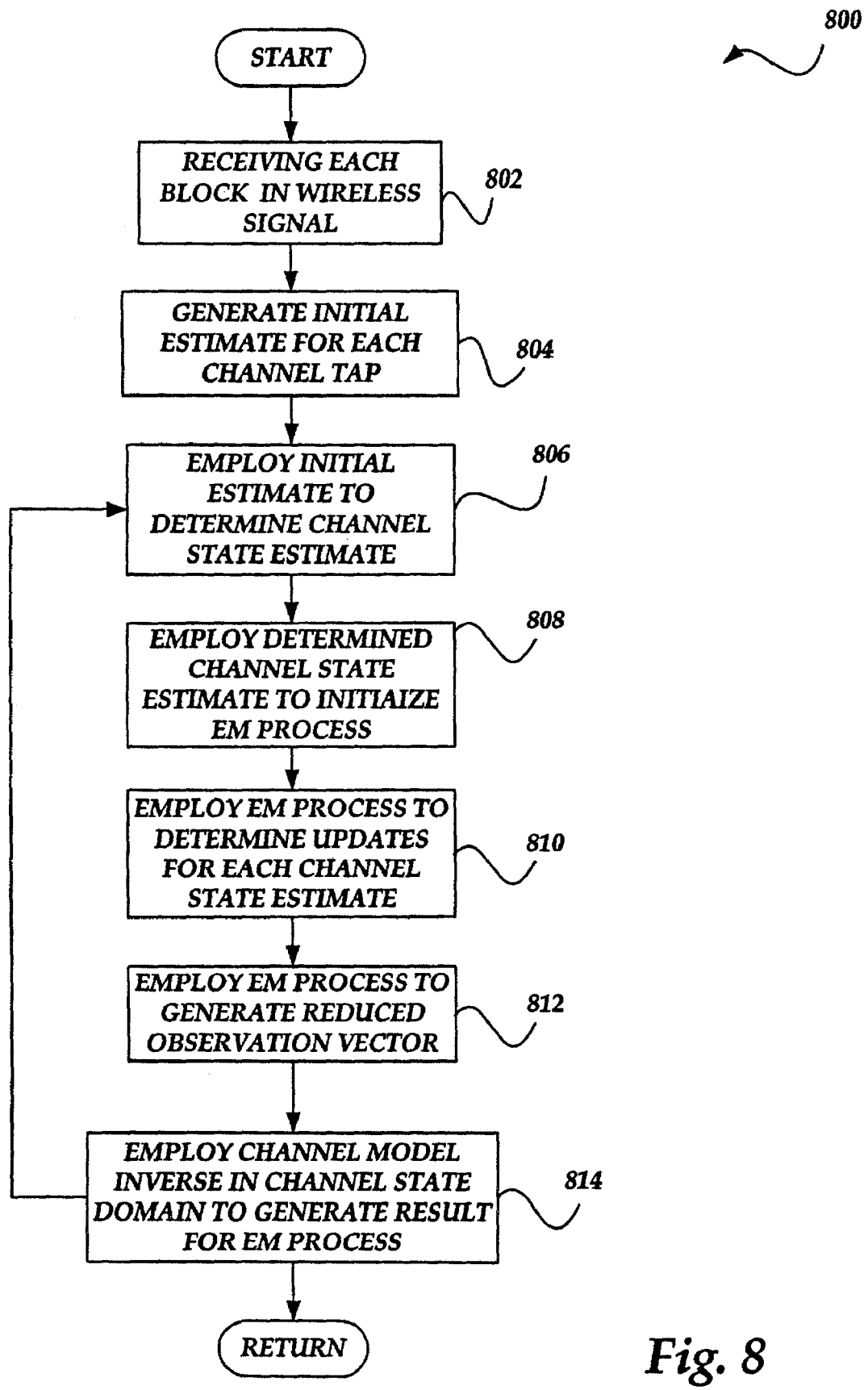
FIG. 8 shows a flow chart illustrating a process for joint channel estimation and detection with a modified EM method that employs a channel model inverse in the channel state domain, in accordance with the invention.

FIG. 8 illustrates a general overview of the process for implementing actions for joint channel estimation and detection for each transmitted block in at least one wireless signal. Moving from a start block, the process transitions to block 802 where each block included in at least one wireless signal is received. Each block includes a training sequence and data. The process advances to block 804 where the training sequence in a received block is employed to generate an initial estimate for each channel tap. Next, the process moves to block 806 where each initial estimate of each channel tap is used to determine at least one channel state estimate. At block 808, each determined channel state estimate is employed to initialize an Expectation Maximization (EM) process.

Stepping to block 810, the EM process is employed to determine an update for each channel state estimate. At block 812, a combining of channel estimates obtained from the EM procedure and from known training sequence is performed (e.g., see Equ(14) in Appendix A, page A-6) and a reduced observation vector formed from updated state estimates is generated. The reduced observation vector can be used to generate a correlation matrix.

At block 814, the EM process is used to generate a result based on a channel model inverse in a channel state domain. To obtain the result, the proposed procedure includes the following actions: (a) a special sequence of channel states is generated in advance based on a channel memory and a symbol alphabet; (b) the ordering of each channel state estimate is rearranged in the reduced observation vector in relation to the sequence for branch realizations above; and (c) based on the data sequence from a) the channel model inverse is generated in the channel state domain to obtain channel taps estimates. These channel tap estimates are sent to the block 806 to generate a new update for each channel state estimate for another EM iteration. Also, each updated channel state estimate is employed to generate an update for each channel tap estimate.

The actions in blocks 806 though 814 except action (a) in 814 are recursively performed until the result of the EM process is less than a predetermined threshold. When the result of the EM process is less than the predetermined threshold, the result is used by the detector to detect each symbol in a received block for a channel. Next, the process moves to a return block to perform other actions.

Although not shown, it is understood that other iterative processes besides the EM process discussed above that could be used with the inventive channel model inverse in substantially the same manner. Additionally, the inventive channel model inverse can be used for iterative channel estimation or joint channel estimation and detection.

The above specification, examples and data provide a complete description of the manufacture and use of the composition of the invention. Since many embodiments of the invention can be made without departing from the spirit and scope of the invention, the invention resides in the claims hereinafter appended.

APPENDIX A

I. INTRODUCTION

Recent studies have shown that antenna diversity transmission is a very promising technique for wireless communications. For example, delay diversity transmission (DDT) [1] may noticeably improve receiver performance. On the other hand, the diversity gain is obtained by artificially introduced intersymbol interference (ISI) and it makes the channel estimation more problematic. For example, the GSM training sequence length may be not enough to provide the required accuracy for channel estimates that in turn deteriorates the receiver performance. This fact motivated us to consider semi-blind detection methods which combine information obtained from the known training sequence and unknown data to improve channel estimates. In this paper we consider data-aided iterative channel estimation (ICE) [2][14], and joint channel estimation and symbol detection [3][4][5] based on the EM-algorithm [7]. To improve the EM convergence for short blocks typically used in wireless communications we introduce a penalized update for channel re-estimates in semi-blind detection that leads to a simplified adaptive EM detector. For channels with known structures we suggest a simple channel model inverse that may be embedded into the EM-based detector and improves the performance. If only hard decisions are used for re-estimation then the EM-based detector is reduced to the ICE. Application of simplified adaptive EM and ICE detectors for DDT in EDGE (Enhanced Data rates for Global Evolution) [6] provides more than 1 dB gain.

The paper is organized as follows. In sections 2,3 we describe EM-based detector and the ICE, respectively. Iterative semi-blind detection for short blocks is addressed in section 4 with discussions followed in section 5.

II. Joint Estimation-Detection via the EM Algorithm

A. Notation

Let's consider the transmission of random symbols $A_t, t=1,2,...T$, $A_t \in \mathcal{A} = \{a_m, m=1,2,...|\mathcal{A}|\}$ over a channel with memory $L$ in presence of additive Gaussian noise. Here capital letters stand for random variables and small letters for its realizations. The channel is described by $|\mathcal{A}|^L$ state trellis where trellis state $S_t$ at time $t$ is formed as $S_t = (A_{t-1}, A_{t-2}, ... A_{t-L})$ and is labeled as $s_l^{(t)} \in \mathcal{S} = \{s_l, l=1,2,...|\mathcal{S}|\}$, $|\mathcal{S}| = |\mathcal{A}|^L$. A transition from a state $S_t$ to $S_{t+1}$ is represented by trellis branch $B_t = (A_t, A_{t-1}, A_{t-2}, ...A_{t-L})^\top$ with branch realizations labeled $b_n^{(t)} \in \mathcal{B} = \{b_n, n=1,2,...|\mathcal{B}|\}$, $|\mathcal{B}| = |\mathcal{A}|^{L+1}$. Below the notation $B_t = b_n$ means that a branch $B_t$ has a label $b_n$. The channel is a mapping of a branch realization $b_n^{(t)} \in \mathcal{B}$ at time $t$ to a complex number $c(b_n^{(t)}) \in \mathcal{C}$, $\mathcal{C} = \{c(b_n), n=1,2,...|\mathcal{B}|\}$, such that $c(b_n^{(t)}) = c(B_t = b_n)$. In case of a linear channel, its output at time $t$ is $$c(B_t) = \mathbf{H}^\top B_t = \sum_{i=0}^{L} h_i A_{t-i}; \quad \mathbf{H} = (h_0, h_1, ... h_L)^\top \qquad (1)$$

Below the elements from space $\mathcal{C}$ are called as channel states. A realization of transmitted symbol sequence of length $T$ corresponds to a branch sequence $\mathbf{X} = (x_1, x_2, ..., x_T)$, $\mathbf{X} \in \mathcal{X}$, $|\mathcal{X}| = |\mathcal{A}|^T$. The observation sequence at the receiver $\mathbf{Y} = (y_1, y_2, ...y_T)$, where $Y_t = c(B_t) + N_t$, $t=1,2,...T$, $N_t \in \mathcal{N}(0, \sigma^2)$. Channel parameters to be estimated are $\tau \triangleq (\{c(b_n), n=1,2,...|\mathcal{B}|\}, \sigma^2)$. In case of a linear channel the number of parameters to estimate is reduced to $\tau \triangleq (\mathbf{H}, \sigma^2)$. It is assumed that channel parameters are constant during a block of transmitted data of length $T$.

B. Parameter Estimation

The ML estimate is to maximize conditional likelihood $p(\mathbf{Y}, \tau | \mathbf{X})$. In case of the known transmitted sequence this estimate is given by [4]

$$\check{c}_0(b_n) = \frac{\sum_{t=1}^{T} y_t \delta(x_t, b_n)}{\sum_{t=1}^{T} \delta(x_t, b_n)}, \qquad (2)$$

where $\delta(x_t, b_n) = \begin{cases} 1; & \text{if } x_t = b_n \\ 0; & \text{if } x_t \neq b_n \end{cases}$ $n \in \{1,2,...|\mathcal{A}|^{L+1}\}$ Note that this estimate is an average of the observations due to $x_t$ with labels $b_n$, and it is applicable only for channel states that are present in the transmitted sequence.

For linear channels the estimate $\hat{\mathbf{H}}$ is obtained by solving the following equation $$\{\sum_{t=1}^{T} x_t^* x_t^\top\} \hat{\mathbf{H}} = \sum_{t=1}^{T} y_t x_t^* \qquad (3)$$

In that case all estimates $\check{c}_0(b_n)$ may be obtained given $\hat{\mathbf{H}}$. Based on $\check{c}_0(b_n)$ and the known $\mathbf{X}$, the estimate for noise variance is $$\hat{\sigma}^2 = \frac{1}{T} \sum_{t=1}^{T} |y_t - \check{c}_0(x_t)|^2.$$

If transmitted sequence $\mathbf{X}$ is unknown at the receiver, then we have to consider the averaged likelihood $$\mathcal{L}_Y(\tau) \triangleq \sum_{\mathbf{X} \in \mathcal{X}} P(\mathbf{Y}, \mathbf{X}, \tau) \qquad (4)$$

where $P(\mathbf{Y}, \mathbf{X}=\mathbf{x}, \tau) = P[\mathbf{X}=\mathbf{x}] \, p(\mathbf{Y}, \tau | \mathbf{X}=\mathbf{x})$; $P[\mathbf{X}]$ is *a priori* probability of $\mathbf{X}$.

The ML estimate $\hat{\tau}$ maximizes the average likelihood;

$$\hat{\tau} = \arg\max_{\tau} \mathcal{L}_Y(\tau). \qquad (5)$$

The problem (5) is prohibitively complex because it requires the evaluation of $|\mathcal{A}|^T$ terms in (4) following by the maximization step (5). However, this problem may be solved via the EM algorithm [7] by maximizing an auxiliary function $Q(\tau, \tau_p)$ if we define it as Kullback-Leibler information measure [9], i.e.:

$$Q(\tau, \tau_p) \triangleq \sum_{\mathbf{X} \in \mathcal{X}} P(\mathbf{Y}; \mathbf{X}, \tau_p) \log P(\mathbf{Y}; \mathbf{X}, \tau) \qquad (6)$$

For a given observation sequence $\mathbf{Y}$, the EM algorithm starts with some initial parameters' guess $\tau_0$. The estimates $\tau_p$ obtained at $p$th iteration are used to calculate better re-estimates $\tau_{p+1}$ by performing the following steps:

1. *E step*: Calculate $Q(\tau, \tau_p)$
2. *M step*: $\tau_{p+1} = \arg\max_{\tau \in \Omega} Q(\tau, \tau_p)$ According to convergence theorems [7],[8] the re-estimates produce a monotonic increase of the likelihood $\mathcal{L}_Y(\tau_{p+1}) \geq \mathcal{L}_Y(\tau_p)$. For likelihood functions without local maxima the algorithm converges to the ML estimation. Otherwise, the convergence to the global maximum requires the transmission of some known symbols to start the algorithm at the neighborhood of the optimum solution.

*C. Auxiliary function maximization*

It is easy to show that the auxiliary function (6) may be presented in the following form [10]

$$Q(\tau, \tau_p) = const + \sum_{t=1}^{T} \sum_{n=1}^{|\mathcal{B}|} [-\log(\hat{\sigma}_p^2) - \frac{|y_t - \check{c}_p(b_n^{(t)})|^2}{\hat{\sigma}_p^2}] P(\mathbf{Y}, X_t = b_n; \tau_p)$$

Maximization of $Q(\tau, \tau_p)$ with respect to $\tau$ gives [4]

$$\hat{c}_{p+1}(b_n) = \frac{\sum_{t=1}^{T} y_t P(\mathbf{Y}, X_t = b_n; \tau_p)}{\sum_{t=1}^{T} P(\mathbf{Y}, X_t = b_n; \tau_p)} \qquad (7)$$

$$\check{c}_{p+1}(b_n) = \hat{c}_{p+1}(b_n) \qquad (7a)$$

$$\hat{\sigma}_{p+1}^2 = \frac{\sum_{t=1}^{T} \sum_{n=1}^{|\mathcal{B}|} |y_t - \check{c}_{p+1}(b_n^{(t)})|^2 P(\mathbf{Y}, X_t = b_n; \tau_p)}{\sum_{t=1}^{T} P(\mathbf{Y}, X_t = b_n; \tau_p)}, \qquad (8)$$

Note that in case of unknown transmitted sequence $\mathbf{X}$, each possible event $X_t = b_n$ for all $b_n$ and for all $t$ is considered in re-estimation procedure, and it allows to estimate all channel states. If transmitted symbols are known, then $P(\mathbf{Y}, X_t = b_n; \tau_p) = \delta(x_t, b_n)$. The notation (7a) will be used below in Sec.4.

To compute $P(\mathbf{Y}, X_t = b_n; \tau_p)$ we can use BCJR algorithm [11]

$P(\mathbf{Y}, X_t = b_n; \tau_p) =$ $\alpha_t(i) P[S_{t+1} = s_j | S_t = s_i] p(y_t | S_t = s_i, S_{t+1} = s_j) \beta_t(j)$ where: $\alpha_t(i) \triangleq P[S_t = s_i] p(y_1, y_2, \ldots y_{t-1} | S_t = s_i)$ $\beta_t(j) \triangleq P[S_t = s_i] p(y_{t+1}, y_{t+2}, \ldots y_T | S_{t+1} = s_j)$ Values $\alpha_t(i)$ and $\beta_t(j)$ may be calculated recursively by forward recursion: $\alpha_1(i) = P[S_t = s_i]$;

$\alpha_t(j) = \sum_{i \in S} \alpha_{t-1}(i) P[S_t = s_j | S_{t-1} = s_i] p(y_{t-1} | S_{t-1} = s_i, S_t = s_j)$ and backward recursion: $\beta_{T+1}(j) = 1$ for all $j$;

$$\beta_t(i) = \sum_{i \in S} \beta_{t+1}(j) P[S_{t+1}=s_j | S_t=i] p(y_t | S_t=s_i, S_{t+1}=s_j)$$

*D. Symbol Detection*

Given the channel trellis, the observed sequence $\mathbf{Y}$ and the estimate $\hat{\tau}$, several detection methods (e.g., Viterbi algorithm) may be used. In particular, it is shown that for certain channels the EM algorithm may be implemented as a combination of MAP and Viterbi algorithms [13]. In this paper we adopt another method based on symbols-by-symbol MAP criteria with the decision rule $$P(\mathbf{Y}, A_t=a_m; \hat{\tau}) \lessgtr P(\mathbf{Y}, A_t=a_k; \hat{\tau})$$

where $$P(\mathbf{Y}, A_t=a_m; \hat{\tau}) = \sum_{b_n \in \mathcal{B}_m} P(\mathbf{Y}, X_t=b_n; \hat{\tau}), \quad \mathcal{B}_m = \{b_n; A_t=a_m\}$$

This method re-uses values $P(\mathbf{Y}, X_t = b_n; \tau_p)$ which are already calculated during EM iterations. Moreover, symbol-wise soft decisions makes straightforward the application of turbo-equalization schemes.

III. ITERATIVE CHANNEL ESTIMATION

The idea of iterative channel estimation (ICE) is to feed back the detected [2] or decoded symbols [14] to the channel estimator and update previous channel estimates assuming that the whole burst is now known by the receiver. In other words, the receiver iteratively updates the channel estimate based on "the extended" training sequence. The ICE scheme presented in [14],[15] is based only on hard decisions used for adaptive updating channel estimates. This scheme is similar to the EM algorithm where it is also assumed that at the estimation stage all transmitted data are known at the receiver. In particular, the ICE scheme is equivalent to the EM algorithm where $P(\mathbf{Y}, X_t = b_n; \tau_p) = \delta(x_t, b_n)$, i.e. only hard decisions are used in the re-estimation formulas.

Iterative channel estimation attempts to solve a reduced optimization problem $$\hat{\tau}_{ICE} = \arg\max_{\tau \in \Omega} \{\max_{\mathbf{X} \in \mathcal{X}} \mathcal{L}(\mathbf{X}, \tau | \mathbf{Y})\} \tag{9}$$

by iteratively performing two steps

1. Maximization $$\hat{\mathbf{X}}_{p+1} = \arg\max_{\mathbf{X} \in \mathcal{X}} \mathcal{L}(\mathbf{X} | \mathbf{Y}, \hat{\tau}_p) \tag{10}$$

2. Maximization $$\hat{\tau}_{p+1} = \arg\max_{\tau \in \Omega} \mathcal{L}(\tau | \mathbf{Y}, \hat{\mathbf{X}}_{p+1}). \tag{11}$$

For linear channels with white Gaussian noise the LS estimate is given by [18]

$$\hat{\tau}_{p+1} = (\hat{\mathbf{D}}_{p+1}^H \hat{\mathbf{D}}_{p+1})^{-1} \hat{\mathbf{D}}_{p+1}^H \mathbf{Y}; \tag{12}$$

where $\hat{\mathbf{D}}_p$ is formed by "the extended" training sequence that includes $\hat{\mathbf{X}}_{p+1}$ (see [14],[15]).

One way to avoid heavy computations of matrix inverse is to use the LMS adaptive rule [18] to update channel estimates as it was proposed in [14]:

$$\hat{\tau}_{p+1} = \hat{\tau}_p + \mu(\hat{\mathbf{D}}_{p+1})^H (\hat{\mathbf{D}}_{p+1} \tau_p - \mathbf{Y}) \tag{13}$$

IV. ITERATIVE METHODS FOR SHORT BLOCKS

A. Semi-blind Detection

It is well known that the efficiency of channel estimation depends on channel memory $L$ and the length of transmitted data $T$. If all transmitted symbols are known, then denominators in (2) are also known that in average results in $T/|\mathcal{B}|$ symbols per state and in corresponding improvement of channel state estimates. However, the situation may be different if transmitted symbols are unknown at the receiver. At that case it may happen that in some blocks certain states may be observed only once, if observed at all. If a state is observed once and it happens to be very noisy, then we can get an unreliable channel estimate that affects the following detection stage. The situation even worse if we estimate a state that is not present in the given block. In the latter case it may lead to a wrong channel model, and that may be seen as another initialization that replaces the initialization $\check{c}_0(b_n)$ provided by known symbols. Recall that the EM provides a (local) max for the joint likelihood function formed by data and channel parameters, and for short blocks (where the objective function is highly irregular) it dramatically depends on the initialization. At the same time it is easy to show that iterative methods provide more robust estimates if some parameterized channel model is available. In particular, for linear channels the estimation of all channel taps may be always obtained (even if not all possible states are observed) provided that $T > L+1$. However, the calculation of channel taps (12) (i.e. the inverse of the parameterized channel model) at every iteration usually requires a lot of computations and it is preferable to simplify or avoid it. Note that the EM re-estimation (7) provides estimates for possible noiseless channel outputs and does not require the calculation of channel taps (channel model inverse). In this section we consider the EM algorithm without the channel model inverse to keep receiver complexity low.

Based on the above, it seems reasonable to limit a contribution of unknown symbols into the channel estimate, and also to take into account the initial channel estimate $\check{c}_0(b_n)$ obtained from the known training sequence. It may be done by introducing block dependent penalties for every estimated state. Similar problem is recently appeared in semi-blind estimation/detection techniques where *both* contributions due to unknown and known data are a subject for joint optimization according to some criteria. For example, a pragmatic approach presented in [16] is based on a weighted linear combination of the LS fit for the training sequence and the blind sub-space estimation. At the same time a choice of weighting parameter $\mu$ is left for optimization.

In this paper we introduce block dependent penalties for each estimated state similar to [12]. In particular, we follow an intuitive idea that a contribution of the blind estimation into each estimated parameter is to be proportional to the number of channel state observations in the given block. In other words, the weighting coefficients $\{\mu_n\}$ for every channel output are proportional to a probability to observe the certain channel output. The proposed channel estimation update replaces (7a) and is presented below:

$$\check{c}_{p+1}(b_n) = \check{c}_p(b_n) - \mu_n(\check{c}_p(b_n) - \hat{c}_{p+1}(b_n)), \tag{14}$$

where: $\mu_n = \frac{|\mathcal{B}|}{T} \sum_{t=1}^{T} P(\mathbf{Y}, X_t = b_n; \tau_p)$ $= \frac{(\# \text{ channel states})(\# \text{ observations of } b_n)}{\# \text{ symbols in the block}};$ the initial estimate $\check{c}_0(b_n)$ is obtained from known the training sequence, $\check{c}_{p+1}(b_n)$ is calculated according to (7); $n = 1, 2, ...|\mathcal{B}|$.

To take into account the presence of training sequence we set $P(\mathbf{Y}, X_t = b_n; \tau_p) = \delta(x_t, b_n)$ for known symbols in the EM re-estimation formulas (7),(8).

Note that the proposed algorithm appears to be similar to the ICE considered earlier. However, the important difference is that the ICE learning parameter $\mu$ in (13) is a constant that should be carefully selected according to the given channel conditions. The proposed channel estimation update allows to adapt the learning parameter depending on the processed block and the iteration number. Another difference is that the ICE is based on a some form of inverse of the channel model. That inverse increases complexity and it is not straightforward for nonlinear channels, if exist at all. It should be also noted that the EM-based detector may be implemented in *on-line* version [17] providing adaptation of channel estimates within a block for fast time-varying channels, while the ICE provides channel adaptation only block-wise. On the other hand, the ICE is expected to converge faster provided the proper initialization and the learning parameter $\mu$.

*B. Inverse of Parametrized Channel Model*

Though the EM algorithm does not require channel model inverse it is desirable to use it if a parametrized channel model is available. Recall that channel model inverse for linear channels reduces the number of parameters to estimate from $|\mathcal{A}|^{L+1}$ to $L+1$, and noticeably improves the accuracy of estimates. Moreover, the channel taps estimation is needed if decision feedback equalizers are used at the maximization step to reduce the detector complexity in channels with long delay spread. On the other hand, channel inverse is to be done for each transmitted block at every EM iteration and its direct implementation based on (12) seems to be too complex. The method (13) proposed for the ICE does not use advantages (e.g., soft decisions $P(\mathbf{Y}, X_t = b_n; \tau_p))$ provided by the EM and still requires $\sim (T(L+1))^2$ multiplications. Below we present a less complex algorithm for channel model inverse embedded into the EM iterations. The algorithm may presented as follows:

1. Make initial estimates of channel taps $\hat{\mathbf{H}}$ based on the known training sequence $\mathbf{m}$.

$\hat{\mathbf{H}}_{p=0} = \mathbf{C_m Y}$, where $\mathbf{C_m} = (\mathbf{M}^H \mathbf{M})^{-1} \mathbf{M}^H$ is precomputed, matrix $\mathbf{M}$ is formed from $\mathbf{m}$.

2. Given $\hat{\mathbf{H}}_p$, calculate all channel states (initial estimates) $\check{c}_p(b_n)$, $n = 1, 2, ...|\mathcal{B}|$ according to (1), and use it for the EM initialization.

3. Calculate channel state updates $\hat{c}_{p+1}(b_n)$ via the EM algorithm according to (7).

4. Update all channel estimates $\check{c}_{p+1}(b_n)$ according to (14). Due to $\check{c}_0(b_n)$ and weighting coefficients $\mu_n$ the updates are valid even if some channel state(s) are not present. As a result we get estimates of all channel states $\check{c}_{p+1} = \{\check{c}_{p+1}(b_n), n=1,2,... |\mathcal{B}|\}$ formed by the proper averaging (7) of the original observation $Y \in \mathcal{X}$, $|\mathcal{X}| = |\mathcal{A}|^T$. Below we call channel states observation $\check{c}_{p+1}$ as the reduced observation vector.

5. Making channel state updates (7) we count how many times every state was visited. It allows us to form a correlation matrix $\mathbf{R_c}$ of the reduced observation vector $\check{c}_{p+1}$. In particular, $\mathbf{R_c} = \mathbf{\Delta_c I}$, where $\mathbf{\Delta_c}$ is a vector, $\mathbf{\Delta_c} = \{\sigma_n^2\}$, $$\sigma_n^2 = \sigma^2 / \sum_{t=1}^{T} P(Y, X_t = b_n; \tau_p), n=1,2,...|\mathcal{B}|.$$

6. For given channel memory $L$ and symbol alphabet $|\mathcal{A}|$ build a sequence $\tilde{X} = (x_1, x_2, ...x_{|\mathcal{B}|})$ that covers all possible branch realizations $\{B_t = b_n, n=1,2,...|\mathcal{B}|\}$ such that each possible branch is appeared only once, i.e. $B_i \neq B_j$ for $i \neq j$; $i,j=1,..|\mathcal{B}|$. These kind of sequences are known as DeBruijn sequences [19] and may be constructed by using a primitive polynomial of degree $L+1$ over $GF(|\mathcal{A}|)$ (see Appendix for details). Given $\tilde{X}$ as the input, the linear channel output is $$\mathbf{c}(\tilde{X}) = (c(B_1), c(B_2), ..., c(B_{|\mathcal{B}|}))^\top, \quad (15)$$

$$c(B_k) = \sum_{i=0}^{L} h_i x_{k-i}; k=1,2,...|\mathcal{B}|.$$

The sequence $\tilde{X}$ depends only on the channel memory $L$ and data alphabet $|\mathcal{A}|$ and may be constructed in advance. For example, for the binary transmission $x_t \in \{0,1\}$ over a channel with memory $L=2$ it may be generated using the primitive polynomial $p(z) = 1+z+z^3$ over $GF(2)$. Resulting DeBruijn sequence $\tilde{X}=(0,1,1,1,0,1,0,0)$ with branch realizations $(000,001,011,111,110,101,010,100)$ corresponds to the sequence of channel states $\mathbf{c}(\tilde{X}) = (c(0), c(1), c(3), c(7), c(6), c(5), c(2), c(4))^\top$.

7. Rearrange channel state estimates $\check{c}_{p+1}$ according to (15), $$\check{c}_{p+1} = (\check{c}_{p+1}(B_1), \check{c}_{p+1}(B_2), ..., \check{c}_{p+1}(B_{|\mathcal{B}|}))^\top.$$

Then, for the known $\tilde{X}$ we can formulate the problem of channel taps $\mathbf{H}$ estimation (channel model inverse problem) in channel state (principal subspace) domain $$\mathbf{c}(\tilde{X}) + \mathbf{W_c} = \check{c}_{p+1}, \quad (16)$$

where $$\mathbf{W_c} = (W_c^{(1)}, W_c^{(2)}, ...W_c^{(|\mathcal{B}|)})^\top, W_c \in \mathcal{N}(0, \mathbf{R_c});$$

$\mathbf{R_c}$ is taken from step 5.

8. Solve the reduced channel model inverse problem in channel state (principal subspace) domain:

$$\hat{\mathbf{H}}_{p+1} = \mathbf{C_c} \check{c}_{p+1}, \quad (17)$$

where $\mathbf{C_c} = (\mathbf{F}^H \mathbf{R_c}^{-1} \mathbf{F})^{-1} \mathbf{F}^H \mathbf{R_c}^{-1}$, the matrix $\mathbf{F}$ of size $|\mathcal{B}| \times (L+1)$ is constructed in advance from the sequence $\tilde{X}$.

Note that we replace the problem (12) of channel inverse in time domain for randomly transmitted data by the inverse problem (17) in channel state domain, where the sequence of channel states $\mathbf{c}(\tilde{X})$ in (16) is constructed in advance from $\tilde{X}$.

Further simplification may be obtained if we assume that all channel states are visited equally such that the denominators in (7) are constant for all blocks, $$\sum_{t=1}^{T} P(\mathbf{Y}, X_t = b_n; \tau_p) = \frac{T}{|\mathcal{B}|}. \quad (18)$$

Hence, $\mathbf{R_c} = \frac{|\mathcal{B}|}{T}\sigma^2 \mathbf{I}$ and it allows to precompute the matrix $\mathbf{C_c}$ in (17) and totally avoid on-line computation of matrix inverse. Furthermore, it may be shown that the matrix $(\mathbf{F}^H\mathbf{F})^{-1}$ is diagonal due to construction of $\tilde{\mathbf{X}}$, and it results in $$\hat{\mathbf{H}}_{p+1} = \mathbf{F}^H \tilde{\mathbf{c}}_{p+1} \quad (19)$$

The number of multiplications in (19) is $(|\mathcal{B}|(L+1))^2$, and the proposed method has lower complexity as long as $|\mathcal{B}| < T$.

9. The EM algorithm stopping rule:

if $P(\mathbf{Y}; \tau_p) = \sum_{i \in S} \alpha_{T+1}(i) <$ threshold, then stop. Otherwise go to step 2 (i.e. repeat the expectation (6) and maximization steps).

C. Simulation Results

The EM-based detector is implemented according to (7),(8),(14)(19). For a preliminary performance evaluation we use BPSK transmission over different channels. Uncoded data are arranged in blocks according to GSM/EDGE slot structure with GSM training sequence in the middle. The standard LS channel estimator is used to provide initial channel estimates (complex values) to the EM-based detector. BER performance of the EM algorithm vs. $E_b/N_o$ ($E_b$=energy per bit) in static typical urban (TU) channel is presented at Fig.1. For comparison the ICE performance with $\mu$=0.01, 0.02 is shown at the same figure. As it was expected, the ICE performance dramatically depends on choice of $\mu$. The GSM training sequence provides acceptable initial estimates for static TU channel, so the ICE performance ($\mu$=0.01) practically coincides with BPSK performance in AWGN channel at $E_b/N_o$<10dB. At the same time the ICE shows a growing loss for SNR>10dB.

As it was mentioned, the EM-based detector without channel model inverse may lead to a wrong channel model resulting in the error floor in performance (dash-2dot lines, iter=2). That error floor is getting lower as the EM iteration number increases, but still remains. The proposed regularization (14) eliminates the error floor (lines with asterisks) and allows to approach to the EM performance with channel model inverse. This simplified adaptive EM outperforms the ICE at high SNR, while shows slower convergence than the ICE at low SNR.

Accuracy of channel estimates calculated by the EM algorithm with and without channel model inverse is presented at Fig.2. These results are obtained by simulation of 10000 blocks of length 100 symbols for 3-taps channel with CIR=(0.77, 0,55, 033). The standard deviation of channel state estimates obtained via the EM algorithm according to (7) without channel inverse is shown by a dashed line with stars. Other lines show accuracy of channel state estimates where channel states are formed from estimated channel taps provided by channel model inverse. The channel taps are calculated for every transmitted block by the LS estimator (12) (solid line) and according to the simplified channel model inverse (19) (line with circles). As one can see the simplified channel model inverse noticeable improves the estimation accuracy compared to the EM algorithm. At the same time it significantly reduces complexity of the LS estimator (12) and its LMS version (13) for the price of some loss in estimation accuracy. Performance of the EM-detector with the proposed simplified channel model inverse in case of GSM block structure coincides with the ICE detector (Fig.1).

Simulation results for DDT in EDGE are presented at Fig.3 for TU50 channel with ideal frequency hoping for MCS6 coding scheme [20] which employs rate 1/2 convolutional code. As we can see the ICE provides more than 1dB improvements for both cases with and without DDT.

V. DISCUSSIONS

The EM-based detector attempts to find the ML solution for the joint channel estimation and data detection problem and provides the optimal method to utilize soft decisions from detection/decoding stages at the re-estimation step. To facilitate the EM convergence to a global max, especially in case of short data blocks typically used in wireless communications, we introduce block dependent penalties in semi-blind detection for each channel state update. For channels with ISI we also present a simple method to embed channel model inverse into the EM iterations which results in performance improvement. The proposed simplified channel model inverse paves a way to simple adaptive *on-line* EM-based detectors for fast-fading ISI channels.

The EM-based receivers seem to be an attractive solution for transmit diversity schemes. Recall that in DDT there are $L+2$ channel taps to be estimated, while in case of space time block codes (STBC) the number of taps to estimate is $2(L+1)$. In the latter case the channel taps are estimated jointly based on two different training sequences. Joint channel estimation itself results in about 1.5-2dB loss in performance compared to a case of single channel estimate with $L<5$. Hence, in case of STBC more performance gain is expected from EM-based detectors.

APPENDIX B

Let's consider a $k$-stage linear recursive shift register (Fig. 4a) that generates a sequence $$X_t = a_1 X_{t-1} \oplus a_2 X_{t-2} \oplus \ldots \oplus a_{k-1} X_{t-k+1} \oplus a_k X_{t-k} \quad (20)$$

where $X_t$ is the sequence value at time $t$; $a_i$ are elements from GF($q$) and $\oplus$ stands for addition in GF($q$). Based on coefficients $a_i$ from (20) let's build a polynomial $p(z)$ of degree $k$ $$p(z) = a_k z^k + a_{k-1} z^{k-1} + a_{k-2} z^{k-2} + \ldots + a_1 z + a_0 \quad (21)$$

If $p(z)$ is a primitive polynomial over GF($q$) forming elements from GF($q^k$), then the corresponding shift register (20) generates a $q$-ary sequence with maximum length $q^k - 1$ (known also as M-sequence). The M-sequence is a periodic sequence where every period consists of all distinct states of $k$-state shift register except the zero state. The extension of M-sequence to include zero state forms DeBruijn sequence [19]. For a given signalling and channel memory there may be several primitive polynomials which have similar autocorrelation, but different cross-correlation properties. In our case only the autocorrelation property is used, so the choice of a primitive polynomial from a possible set is arbitrary. As an example, let's consider the binary antipodal transmission over ISI channel with L+1=4 taps. The primitive polynomial over GF(2) forming GF($2^4$) is $p(z) = z^4 + z + 1$. The corresponding shift register (Fig.4b) with initialization 0001 after $2^k$ steps forms the sequence $\tilde{X}=\{0,1,1,1,1,0,1,0,1,1,0,0,1,0,0,0\}$. It may be shown that for the binary antipodal signalling the partial autocorrelation matrix with window ($L+1$) is diagonal, i.e., $F^H F = 2^k I$. The generalization for non-binary case is straightforward.

APPENDIX C

[1] N. Seshadri, J.H. Winters, "Two signaling schemes for improving the error performance of frequency-division-duplex FDD transmission systems using transmitter antenna diversity", in *Proc. IEEE VTC* 1993, pp. 508-511.

[2] K. H. Chang, C.N.Georghiades, "Iterative Joint Sequence and Channel Estimation for Fast Time-Varying Intersymbol Interference Channels", in *Proc. IEEE ICC '95*, pp. 357-361.

[3] N. Seshadri, "Joint Data and Channel Estimation Using Fast Blind Trellis Search Techniques", *IEEE Trans. Comm.*, vol. 42, pp.1000-1011, Feb./Mar./Apr. 1994.

[4] G. K. Kaleh, R. Vallet, "Joint Parameter Estimation and Symbol Detection for Linear and Nonlinear Unknown Channels", *IEEE Trans. Comm.*, vol. 42, pp. 2406-2413, July 1994.

[5] C. N. Georghiades, J. Han, "Sequence Estimation in the Presence of Random Parameters via EM Algorithm", *IEEE Trans. Comm.*, vol. 45, pp. 300-308, March 1997.

[6] R. Pirhonen et al., "TDMA Convergence for Packet Data Services", *IEEE Personal Comm.*, pp. 68-73, June 1999.

[7] A. Dempster, N. M. Laird, D. B. Rubin, "Maximum likelihood from incomplete data via EM algorithm", *Journal of the Royal Stat. Soc.*, vol. B-39, pp. 1-38, 1977.

[8] C. F. J. Wu, "On convergence Properties of the EM algorithm", *The Annals of Statistics*, vol. 11, No. 1, pp. 95-103, 1983.

[9] S. Kullback, *Information Theory and Statistics*, New York: John Wiley, 1959.

[10] N. Nefedov, D. Foursov, "An EM-based Receiver for Short Block Semi-Blind Detection", in *Proc. IEEE ICT 2001*, pp. 70-75.

[11] L. R. Bahl, et al., "Optimal Decoding of Linear Codes for Minimizing Symbol Error Rate", *IEEE Trans. Inform. Theory*, vol. 20, pp. 284-287, Mar. 1974.

[12] C. Andrieu, A. Doucet, "Simulated Annealing for Maximum a Posteriori Parameter Estimation of Hidden Markov Models", *IEEE Trans. Inform. Theory*, vol. 46, pp. 994-1004, May 2000.

[13] W. Turin, "MAP Decoding in Channels with Memory", *IEEE Trans. Comm.*, pp. 757-763, v. 48, May 2000.

[14] N. Nefedov, M. Pukkila, "Iterative Channel Estimation for GPRS", in *Proc. IEEE PIMRC 2000*, pp. 999-1003.

[15] N. Nefedov, M. Pukkila, "Turbo Equalization and Iterative (Turbo) Estimation Techniques for Packet Data Transmission", in *Proc. Int Symp. on Turbo Codes (ISTC 2000)*, pp. 423-426.

[16] V. Buchoux et al., "On the Performance of Semi-Blind Subspace-Based Channel Estimation", *IEEE Trans. on SP*, vol. 48, pp. 1750-1759, June 2000.

[17] V. Krishnamurty, J. Moore, "On-line Estimation of Hidden Markov Model Parameters Based on Kullback-Leibler Information Measure", *IEEE Trans. on SP*, vol. 41, pp. 2557-2573, Aug. 1993.

[18] S. Haykin, *Adaptive Filter Theory*, 3d ed., Prentice Hall, 1996.

[19] S. W. Golomb, *Shift Register Sequences*, Holden-Day Inc., 1967.

[20] ETSI GSM05.03 *Digital cellular telecommunications system (Phase 2+).Channel coding*, rel. 1999.

I claim:

1. A method for joint channel estimation and detection for each transmitted block in at least one wireless signal, comprising:
   (a) receiving each block included in at least one wireless signal, wherein each block includes a training sequence and data;
   (b) employing the training sequence in a received block to generate an initial estimate for each channel tap;
   (c) employing each initial estimate of each channel tap to determine at least one channel state estimate and employing each determined channel state estimate to initialize an iterative process;
   (d) employing the iterative process to determine an update for each channel state estimate and employing each updated channel state estimate to generate an update for each channel tap estimate, wherein generating each updated channel tap estimate is obtained via a reduced observation vector to be generated that includes updated estimates that are generated for all channel states; and
   (e) employing the iterative process to generate a result based on a channel model inverse in a channel state domain, wherein the result of the iterative process is employed to detect each symbol in each received block, including:
      (i) recursively performing the actions of sub-paragraphs (c), (d) and (e) until the result of the iterative process is less than a predetermined threshold; and
      (ii) when the result of the iterative process is less than the predetermined threshold, employing the result of the iterative process to detect each symbol in the received block for a channel.

2. The method of claim 1, wherein the actions of the iterative process further comprise:
   (a) generating in advance a particular sequence for each initial occurrence of each branch realization based on a channel memory and a symbol alphabet;
   (b) rearranging an ordering of each channel state estimate in the reduced observation vector in relation to the sequence for branch realizations; and
   (c) generating a channel model inverse in the channel state domain and employing the channel model inverse to generate a new update for each channel estimate.

3. The method of claim 2, subparagraph (a), wherein the particular sequence is generated by a DeBrujin sequence.

4. The method of claim 1, subparagraph (d), further comprising generating a correlation matrix based on the reduced observation vector.

5. The method of claim 1, further comprising employing a semi-blind process to combine information obtained from at least one known training sequence and unknown data to iteratively determine channel estimates.

6. The method of claim 1, wherein the channel model inverse further comprises a low-dimensional matrix.

7. The method of claim 1, wherein the wireless signal is communicated in a multiple access scheme, including Global System for Mobile communications (GSM) and Time Division Multiple Access (TDMA).

8. The method of claim 1, wherein the iterative process is based on an Expectation Maximization (EM) algorithm.

9. A method for iterative channel estimation for each transmitted block in at least one wireless signal, comprising:
   (a) receiving each block included in at least one wireless signal, wherein each block includes a training sequence and data;
   (b) employing the training sequence in a received block to generate an initial estimate for each channel tap;
   (c) employing each initial estimate of each channel tap to determine at least one channel state estimate and employing each determined channel state estimate to initialize an iterative process;
   (d) employing the iterative process to determine an update for each channel state estimate and employing each updated channel state estimate to generate an update for each channel tap estimate, wherein generating each updated channel tap estimate is obtained via a reduced observation vector to be generated that includes updated estimates that are generated for all channel states; and
   (e) employing the iterative process to generate a result based on a channel model inverse in a channel state domain, wherein the result of the iterative process is employed to detect each symbol in each received block, including:
      (i) recursively performing the actions of sub-paragraphs (c), (d) and (e) until the result of the iterative process is less than a predetermined threshold; and
      (ii) when the result of the iterative process is less than the predetermined threshold, employing the result of the iterative process to detect each symbol in the received block for a channel.

10. The method of claim 9, wherein the actions of the iterative process further comprise:
    (a) generating in advance a particular sequence for each initial occurrence of each branch realization based on a channel memory and a symbol alphabet;
    (b) rearranging an ordering of each channel state estimate in the reduced observation vector in relation to the sequence for branch realizations; and
    (c) generating a channel model inverse in the channel state domain and employing the channel model inverse to generate a new update for each channel estimate.

11. A system for joint channel estimation and detection for each block in at least one received wireless signal, comprising:
    (a) an antennae module for receiving at least one wireless signal; and
    (b) a detector module for performing actions related to joint channel estimation and detection of at least one received wireless signal, including:
       (i) receiving each block included in at least one wireless signal, wherein each block includes a training sequence and data;
       (ii) employing the training sequence in a received block to generate an initial estimate for each channel tap;
       (iii) employing each initial estimate of each channel tap to determine at least one channel state estimate and employing each determined channel state estimate to initialize an iterative process;
       (iv) employing the iterative process to determine an update for each channel state estimate and employing each updated channel state to generate an update for each channel tap estimate, wherein generating each updated channel tap estimate is obtained via a reduced observation vector to be generated that includes updated estimates that are generated for all channel states; and
       (v) employing the iterative process to generate a result based on a channel model inverse in a channel state domain, wherein the result of the iterative process is employed to detect each symbol in each received block for a channel.

12. The system of claim 11, wherein the iterative process is based on an Expectation Maximization Algorithm.

13. The system of claim 11, further comprising a base station that includes the antennae module and the detector.

14. The system of claim 11, further comprising a mobile device that includes the antennae module and the detector module.

15. The system of claim 11, wherein the system operates in a multiple access wireless communication system that includes Global System for Mobile communications (GSM) and Time Division Multiple Access (TDMA).

16. An apparatus for joint channel estimation and detection for each transmitted block in at least one wireless signal, comprising:
 (a) means for receiving each block included in at least one wireless signal, wherein each block includes a training sequence and data;
 (b) means for employing the training sequence in a received block to generate an initial estimate for each channel tap;
 (c) means for employing each initial estimate of each channel tap to determine at least one channel state estimate and employing each determined channel state estimate to initialize an iterative process;
 (d) means for employing the iterative process to determine an update for each channel state estimate and employing each updated channel state to generate an update for each channel tap estimate, wherein generating each updated channel tap estimate is obtained via a reduced observation vector to be generated that includes updated estimates that are generated for all channel states; and
 (e) means for employing the iterative process to generate a result based on a channel model inverse in a channel state domain, wherein the result of an iterative process based on an Expectation Maximization (EM) algorithm employed to detect each symbol in each received block for a channel.

* * * * *